United States Patent
Courtin et al.

(10) Patent No.: US 11,787,526 B2
(45) Date of Patent: Oct. 17, 2023

(54) SYSTEM AND METHOD FOR LIFT AUGMENTATION OF AIRCRAFT WINGS

(71) Applicant: ELECTRA AERO, INC., Falls Church, VA (US)

(72) Inventors: Christopher B. Courtin, Somerville, MA (US); Mark Drela, Cambridge, MA (US); Robert John Hansman, Jr., Cambridge, MA (US); John S. Langford, III, Falls Church, VA (US); Oliver Masefield, Stans (CH)

(73) Assignee: Electra Aero, Inc., Manassas, VA (US)

( * ) Notice: Subject to any disclaimer, the term of this patent is extended or adjusted under 35 U.S.C. 154(b) by 0 days.

(21) Appl. No.: 17/560,383

(22) Filed: Dec. 23, 2021

(65) Prior Publication Data

US 2023/0063801 A1  Mar. 2, 2023

Related U.S. Application Data

(60) Provisional application No. 63/239,233, filed on Aug. 31, 2021.

(51) Int. Cl.
*B64C 9/28* (2006.01)
*B64C 11/00* (2006.01)
(Continued)

(52) U.S. Cl.
CPC ............... *B64C 9/28* (2013.01); *B64C 3/58* (2013.01); *B64C 9/18* (2013.01); *B64C 9/24* (2013.01);
(Continued)

(58) Field of Classification Search
CPC ....... B64C 2009/005; B64C 9/16; B64C 9/18; B64C 9/20; B64C 9/323; B64C 9/36
See application file for complete search history.

(56) References Cited

U.S. PATENT DOCUMENTS 2,470,602 A * 5/1949 Campbell ............... B64C 39/08
244/90 R
2,978,204 A * 4/1961 Davidson ................. B64C 9/38
244/226

(Continued)

FOREIGN PATENT DOCUMENTS

EP  2808250 A1 * 12/2014 ............. B64C 13/38
GB  601118 A * 4/1948

OTHER PUBLICATIONS

Hyun D. Kim, Aaron T. Perry, and Phillip J. Ansell, A Review of Distributed Electric Propulsion Concepts for Air Vehicle Technology, Conference Paper, Jul. 9-11, 2018, 21 pages, 2018 American Institute of Aeronautics and Astronautics (AIAA)/Institute of Electrical and Electronics Engineers (IEEE) Electric Aircraft Technologies Symposium, Cincinnati, Ohio.

(Continued)

Primary Examiner — Philip J Bonzell
(74) Attorney, Agent, or Firm — Duane Morris LLP

(57) ABSTRACT

A system and method for lift augmentation of an aircraft having a wing with a leading edge and a trailing edge extending along a wingspan, a plurality of thrust-producing devices connected to the bottom of said wing, at least one flap connected to an inboard portion of said wing proximate the trailing edge, and an aircraft roll control device connected to said wing, wherein the improvement comprises a plurality of slipstreams associated with a plurality of thrust producing devices and a flap adaptable to deflect from a chord of the inboard portion of the wing.

13 Claims, 18 Drawing Sheets

(51) Int. Cl.
  *B64C 9/18* (2006.01)
  *B64D 27/24* (2006.01)
  *B64C 3/58* (2006.01)
  *B64C 9/24* (2006.01)
  *B64C 9/00* (2006.01)
(52) U.S. Cl.
  CPC .............. *B64C 11/00* (2013.01); *B64D 27/24* (2013.01); *B64C 2009/005* (2013.01)

(56) References Cited

U.S. PATENT DOCUMENTS

| | | | | |
|---|---|---|---|---|
| 3,059,876 | A * | 10/1962 | Platt | B64C 29/0033 244/7 C |
| 3,162,402 | A * | 12/1964 | Alvarez-Calderon | B64C 23/08 244/206 |
| 3,447,763 | A | 6/1969 | Allcock | |
| 4,426,054 | A | 1/1984 | Wang | |
| 7,258,308 | B2 * | 8/2007 | Beyer | B64C 9/18 244/215 |
| 9,789,768 | B1 * | 10/2017 | Meier | B64C 35/00 |
| 10,423,168 | B2 * | 9/2019 | Shepshelovich | B64C 3/50 |
| 2012/0032030 | A1 * | 2/2012 | Ruckes | B64C 9/18 244/215 |
| 2016/0342160 | A1 * | 11/2016 | Shepshelovich | B64C 39/024 |
| 2017/0190436 | A1 | 7/2017 | Ullman et al. | |
| 2019/0002076 | A1 * | 1/2019 | Markley | B64C 3/50 |
| 2021/0139141 | A1 | 5/2021 | St. Clair et al. | |
| 2021/0261245 | A1 * | 8/2021 | Tao | B64C 11/28 |
| 2021/0331791 | A1 * | 10/2021 | Geuther | B64C 3/50 |

OTHER PUBLICATIONS

Hervey C. Quigley, Robert C. Innis, and Curt A. Holzhauser, a Flight Investigation of the Performance, Handling Qualities, and Operational Characteristics of a Deflected Slipstream STOL Transport Airplane Having Four Interconnected Propellers, Technical Note, Mar. 1964, 62 pages, The National Aeronautics and Space Administration (NASA), Washington, D.C.

Richard E. Kuhn, Semiempirical Procedure for Estimating Lift and Drag Characteristics of Propeller-Wing-Flap Configurations for Vertical and Short-Take-Off-and-Landing Airplanes, Memorandum, Feb. 1959, 40 pages, The National Aeronautics and Space Administration (NASA), Washington, D.C.

Sean Clarke P.E., Yohan Lin, Kurt Papathakis, and Aamod Samuel, LEAPTech HEIST Power Architecture and Testing, Symposium Presentation, Jun. 25, 2015, 22 pages, 2015 American Institute of Aeronautics and Astronautics (AIAA) Technology, Integration, and Operations Conference, Dallas, Texas.

Sean Clarke P.E., Aircraft Electric Propulsion Systems: Applied Research at NASA, Symposium Presentation, Jun. 17, 2015, 37 pages, 2015 Institute of Electrical and Electronics Engineers (IEEE) Transportation Electrification Conference and Expo, The National Aeronautics and Space Administration (NASA), Dearborn, Michigan.

Michael Patterson, Nick Borer, and Brian German, A Simple Method for High-Lift Propeller Conceptual Design, Presentation, Jan. 5, 2016, 41 pages, The National Aeronautics and Space Administration (NASA), USA.

Arthur Dubois, Martin Van Der Geest, Joeben Bevirt, Sean Clarke, Robert J. Christie, and Nicholas K. Borer, Design of an Electric Propulsion System for SCEPTOR, Conference Paper, Published Online Jun. 13, 2016, 30 pages, The American Institute of Aeronautics and Astronautics (AIAA), USA.

Michael D. Patterson, Joseph M. Derlaga, and Nicholas K. Borer, High-Lift Propeller System Conguration Selection for NASA's SCEPTOR Distributed Electric Propulsion Flight Demonstrator, Conference Paper, Published Online Jun. 10, 2016, 19 pages, 16th American Institute of Aeronautics and Astronautics (AIAA) Aviation Technology, Integration, and Operations Conference, Washington, D.C.

Nicholas K. Borer, Michael D. Patterson, Jeffrey K. Viken, Mark D. Moore, Sean Clarke, Matthew E. Redifer, Robert J. Christie, Alex M. Stoll, Arthur Dubois, Joeben Bevirt, Andrew R. Gibson, Trevor J. Foster, Philip G. Osterkamp, Design and Performance of the NASA SCEPTOR Distributed Electric Propulsion Flight Demonstrator, Conference Paper, Jun. 13, 2016, 20 pages, The American Institute of Aeronautics and Astronautics (AIAA), USA.

Nicholas K. Borer, Joseph M. Derlaga, Karen A. Deere, Melissa B. Carter, Sally A. Viken, Michael D. Patterson, Brandon L. Litherland, and Alex M. Stoll, Comparison of Aero-Propulsive Performance Predictions for Distributed Propulsion Configurations, Conference Paper, Published Online Jan. 5, 2017, 16 pages, 55th American Institute of Aeronautics and Astronautics (AIAA) Aerospace Sciences Meeting, Grapevine, Texas.

Karen A. Deere, Sally A. Viken, Melissa B. Carter, Jeffrey K. Viken, Michael R. Wiese, and Norma Farr, Computational Analysis of Powered Lift Augmentation for the LEAPTech Distributed Electric Propulsion Wing, Conference Paper, Published Online Jun. 2, 2017, 20 pages, 35th American Institute of Aeronautics and Astronautics (AIAA) Applied Aerodynamics Conference, Denver, Colorado.

Michael D. Patterson and Nicholas K. Borer, Approach Considerations in Aircraft with High-Lift Propeller Systems, Conference Paper, Published Online Jun. 5, 2017, 18 pages, 17th American Institute of Aeronautics and Astronautics (AIAA) Aviation Technology, Integration, and Operations Conference, Denver, Colorado.

Karen A. Deere, Sally A. Viken, Melissa B. Carter, Jeffrey K. Viken, Joseph M. Derlaga, and Alex M. Stoll, Comparison of High-Fidelity Computational Tools for Wing Design of a Distributed Electric Propulsion Aircraft, Conference Paper, Published Online Jun. 2, 2017, 22 pages, 35th American Institute of Aeronautics and Astronautics (AIAA) Applied Aerodynamics Conference, Denver, Colorado.

Jeffrey K. Viken, Sally A. Viken, Karen A. Deere, and Melissa B. Carter, Design of the Cruise and Flap Airfoil for the X-57 Maxwell Distributed Electric Propulsion Aircraft, Journal, Published Online Jun. 2, 2017, 41 pages, 35th American Institute of Aeronautics and Astronautics (AIAA) Applied Aerodynamics Conference, Denver, Colorado.

Kurt Papathakis, Patricia Loyselle, and Robert McSwain, Determining technology feasibility of non-flammable / non-explosive Nano-Electro Fuel (NEF) batteries and acoustically-superior Rim-Driven Motors (RDMs) with air-bearings for electric flight, Poster, 2019, 1 page, The National Aeronautics and Space Administration (NASA), USA.

Christopher B. Courtin, Analysis of the Impact of Control System Design on the Required Runway Length of Electric Super-Short Takeoff and Landing Aircraft, Thesis, Nov. 3, 2020, 72 pages, Massachusetts Institute of Technology, Cambridge, Massachusetts.

Christopher Courtin, Michael Burton, Patrick Butler, Alison Yu, Parker D. Vascik and R. John Hansman, Feasibility Study of Short Takeoff and Landing Urban Air Mobility Vehicles Using Geometric Programming, Conference Paper, Published Online Jun. 24, 2018, 25 pages, 2018 Aviation Technology, Integration, and Operations Conference, Atlanta, Georgia.

Christopher B. Courtin and R. John Hansman, Model Development for a Comparison of VTOL and STOL Electric Aircraft Using Geometric Programming, Conference Paper, Published Online Jun. 14, 2019, 20 pages, The American Institute of Aeronautics and Astronautics (AIAA) Aviation 2019 Forum, Dallas, Texas.

Christopher B. Courtin and R. John Hansman, an Assessment of Electric STOL Aircraft, Report, Sep. 5, 2019, 139 pages, MIT International Center for Air Transportation (ICAT), Cambridge, Massachusetts.

Christopher B. Courtin, R. John Hansman, Mark Drela, Flight Test Results of a Subscale Super-STOL Aircraft, Conference Paper, Published Online Jan. 5, 2020, 16 pages, The American Institute of Aeronautics and Astronautics (AIAA) Scitech 2020 Forum, Orlando, Florida.

Christopher B. Courtin, Ara Mahseredjian, Annick J. Dewald, Mark Drela, and R. John Hansman, a Performance Comparison of ESTOL

(56) References Cited

OTHER PUBLICATIONS and EVTOL Aircraft, Conference Paper, Published Online, Jul. 28, 2021, 29 pages, The American Institute of Aeronautics and Astronautics (AIAA) Aviation 2021 Forum, Virtual Event, USA.

S. Tsach, L. London, D. Kleiman, L. Abush, and A. Tatievsky, ESTOL (Extremely Short Take-Off and Landing), Article, Uploaded Oct. 22, 2015, 12 pages.

Michael D. Patterson, Conceptual Design of High-Lift Propeller Systems for Small Electric Aircraft, Dissertation, May 10, 2016, 277 pages, Georgia Institute of Technology, Atlanta, Georgia.

Mark D. Moore, Distributed Electric Propulsion (DEP) Aircraft, Presentation, Oct. 12, 2015, 27 pages, 5th Symposium on Collaboration in Aircraft Design, The National Aeronautics and Space Administration (NASA), Naples, Italy.

Henri Ziegler, The Development of Short Range Air Transport Through The Use of V/STOL Aircraft, Journal, May 1961, 16 pages, The Journal of the Royal Aeronautical Society vol. 65 No. 605, London, United Kingdom.

CJ Bixby, Sean Clarke, Tom Rigney, Matt Redifer, Dave Cox, Ryan Wallace, Keith Harris, and Ethan Nieman, Flight Demonstrations and Capabilities (FDC) Scalable Convergent Electric Propulsion Technology and Operations Research (SCEPTOR) Critical Design Review Day 1 Package, Presentations, Nov. 15, 2016, 242 pages, The National Aeronautics and Space Administration (NASA), USA.

Nick Borer, Jeff Viken, John Theisen, Yohan Lin, Aric Warner, Phil Burkhardt, and CJ Bixby, Flight Demonstrations and Capabilities (FDC) Scalable Convergent Electric Propulsion Technology and Operations Research (SCEPTOR) Critical Design Review Day 2 Package, Presentations, Nov. 15, 2016, 247 pages, The National Aeronautics and Space Administration (NASA), USA.

CJ Bixby, Mark Moore, Tom Rigney, Tim Williams, Matt Redifer, Dave Cox, Bruce Cogan, and Sean Clarke, Convergent Aeronautics Solution (CAS) Scalable Convergent Electric Propulsion Technology and Operations Research (SCEPTOR) Preliminary Design Review Day 1 Package, Presentations, Nov. 12, 2015, 117 pages, The National Aeronautics and Space Administration (NASA), USA.

Nick Borer, Jeff Viken, Ethan Nieman, Yohan Lin, Aric Warner, Phil Burkhardt, and CJ Bixby, Convergent Aeronautics Solution (CAS) Scalable Convergent Electric Propulsion Technology and Operations Research (SCEPTOR) Preliminary Design Review Day 2 Package, Presentations, Nov. 12, 2015, 121 pages, The National Aeronautics and Space Administration (NASA), USA.

Airflow, Website Homepage, 2021, Online, https://www.airflow.aero/.

Various, Airflow Blog Webpage, Articles, 2021, Online, https://www.airflow.aero/blog.

Daniel Bachmann, Meet the eSTOLs, a New Class of Electric Short Landing Aircraft That Will Change Urban Travel, Article, Apr. 11, 2021, Robb Report, Online, https://robbreport.com/motors/aviation/electric-stol-aircrafts-landing-1234603082/.

International Search Report and Written Opinion of PCT/US2022/042043 Issued by the International Searching Authority; dated Sep. 22, 2022; Entire Document.

Albert R. Gnadt, Stewart Isaacs, Rachel Price, Millicent Dethy, Christine Chappelle, Hybrid Turbo-Electric STOL Aircraft for Urban Air Mobility, Conference Paper, Jan. 7-11, 2019, 22 pages, 2019 American Institute of Aeronautics and Astronautics (AIAA) SciTech Forum, San Diego, California.

* cited by examiner

SYSTEM AND METHOD FOR LIFT AUGMENTATION OF AIRCRAFT WINGS

CROSS REFERENCE TO RELATED APPLICATION

This application claims priority to U.S. Provisional Application No. 63/239,233 filed on Aug. 31, 2021, the entirety of which is incorporated by reference herein.

FIELD

The present disclosure generally relates to the field of aviation. More specifically, the present disclosure generally relates to a blown lift aircraft capable of achieving steep descent while providing enhanced lateral control.

BACKGROUND

Traditionally, blown lift, blown wing, or deflected slipstream aircraft refer to an aircraft that has a wing that interacts with the blowing from a propeller over a large fraction of the surface of a multi-element (e.g., flaps, slats, and tabs) aerofoil. Unlike traditional aircraft that cause lift by the movement of the aircraft through air, a blown lift aircraft blows air over the wing and causes the slipstream, or wake, from the propeller that interacts with the wing to cause lift. This is one method of powered lift augmentation similar to jet flaps (which use jet efflux to achieve a comparable phenomenon).

A majority of traditional blown lift or blown wing aircraft used turboprop engines that imposed a practical limit of four engines and four propellers. This limit was imposed by the complexity of integrating and maintaining many large engines, and the inefficiency and unavailability of relatively small turboprops. Consequently, these traditional aircraft had large propellers relative to the wings as measured by the ratio of propeller diameter to wing chord.

There are two significant challenges associated with blown lift or blown wing aircraft that use propellers to generate lift augmentation. Specifically, the first challenge is how to achieve a steep descent angle on approach and landing, with the high power-settings required by the propeller to achieve significant blown lift augmentation. Steep descent has traditionally only been possible by utilizing extremely high landing flap deflections (in excess of 95 degrees), thereby creating sufficient excess drag. The second challenge is how to achieve good low-speed lateral-directional control (i.e., maintain lateral-directional control authority). This is especially true in gusty conditions. Low approach speeds achievable via blown lift would leave conventional unblown ailerons in a region of low dynamic pressure and high angle of attack. As a result, effective roll control requires blown ailerons integrated into highly deflected flaps and roll spoilers.

Lateral-directional control authority refers to the magnitude of the rolling or yawing moments that the pilot or control system can generate via deflection of the aerodynamic control surfaces or propulsion power settings. These moments are used to control the roll and yaw attitude of the aircraft, in order to counter disturbances and maintain the desired trajectory.

Previous blown lift aircraft have needed a high degree of mechanical complexity to overcome these challenges, including integrating propeller blown ailerons into a highly deflected triple slotted flap or blown ailerons through a jet powered by an engine bleed-air system. The complexity, and relative ineffectiveness of ailerons integrated into highly deflected flaps, has limited the practical application of this technology.

The present disclosure addresses these challenges and problems such that high lift augmentation is achieved with high net thrust during takeoff, net drag on approach and landing, and sufficient blowing over lateral control surfaces to enhance the low-speed lateral-directional control authority in all phases of flight without the mechanical complexity of traditional solutions.

SUMMARY OF THE DISCLOSURE

The present disclosure is directed to a blown lift aircraft that uses the propeller slipstream to blanket, or cover, a majority of an aircraft wing to generate high lift coefficients and slow flight speeds, which enable short takeoff and landings (STOL). STOL aircraft are differentiated from vertical takeoff and landing (VTOL) aircraft, because STOL aircraft will still need a form of runway in order to takeoff and land. VTOL aircraft, by definition, do not require a runway and by design are constructed accordingly. As will be discussed in further detail below, the aforementioned challenges are obviated by the present disclosure, which identifies the correct selection of the ratio of propeller size to wing chord, number of propellers, flap size, and flap deflection to concentrate and deflect the propeller slipstream in such a way as to generate high lift with sufficiently low thrust that a steep landing approach is possible without requiring high drag-inducing flap deflections. Additionally, the selection of these choices is enabled by a distributed electric propulsion (DEP) system. DEP refers to an aircraft propulsion architecture that uses many electric motors to drive fans, propellers, motor pods or other thrust-producing devices (propulsors) that are distributed around the airframe. The number of motors is, according to some embodiments, more than four. In various embodiments, a plurality of motors are used. Because electric motors can easily be made in a wide range of power classes, without significant changes in efficiency, this advantageously is an effective and mechanically simple way to power any number of propulsors. In the DEP configurations discussed herein, the use of electric motors enables propellers to be located to maximize the blown wing effect. As will be disclosed herein, blowing of the ailerons can be used to enhance the low-speed lateral control authority.

According to various embodiments, a system for lift augmentation is disclosed. The system comprises an aircraft having a wing with a leading edge and a trailing edge extending along a wingspan, a plurality of thrust-producing devices connected to the bottom of said wing, at least one flap connected to an inboard portion of said wing proximate the trailing edge, and an aircraft roll control device connected to said wing. The system also comprises a plurality of slipstreams, wherein each of the plurality of slipstreams is associated with a respective one of the plurality of thrust producing devices, and wherein the plurality of slipstreams blow over at least 50% of said wingspan and at least one of the plurality of said thrust producing devices has a propeller diameter of 20% to 80% of the wing chord; and a flap is adaptable to deflect 20-90 degrees from a chord of the inboard portion of the wing, wherein the flap chord is at least 20% of the wing chord.

According to various embodiments, a system for lift augmentation of an aircraft is disclosed. The system comprises a wing with a leading edge and a trailing edge extending along a wingspan, a distributed electric propulsion system including a plurality of propellers connected to said wing, at least one slotted flap connected to an inboard portion of said wing proximate the trailing edge with a turning vane, and a slotted aileron connected to an outboard portion of said wing proximate the trailing edge. The system further comprises a plurality of slipstreams, wherein the slipstreams are associated with each of the plurality of propellers, wherein the slipstreams blankets 50% or more of said wingspan, and the propellers have a propeller diameter of 20% to 80% of the wing chord; a flap is adaptable to deflect 20-90 degrees from the chord of the inboard portion of the wing wherein a flap chord to said wing chord ratio is at least 20%, wherein said flap is blanketed by the slipstream wake of said propellers, and said flap is slotted; and an aileron is adaptable to droop below the trailing edge of the wing, said aileron has at least one slot that opens for downward deflections over 20 degrees, and said aileron is blanketed by the slipstream wake of the propellers.

According to various embodiments, a method for lift augmentation with a distributed electric propulsion is disclosed. Wherein the distributed electric propulsion system utilizes a plurality of propellers for thrust for the aircraft, wherein said propeller slipstream wake is configured to blow over the top and bottom of a wing with a leading edge and a trailing edge, and a propeller diameter of 20% to 80% of the wing chord, and the method comprises the steps of positioning a plurality of slotted flaps, that are blown by at least two propeller slipstreams per flap, wherein said flaps are adaptable to deflect 20-90 degrees from a wing chord, and wherein a flap chord to said wing chord ratio is at least 20%, into a deflected state with reference to the inboard portion of the wing chord; positioning at least one aileron per a wing, that are blown by propeller slipstreams, wherein said aileron has at least one slot per said aileron, wherein said aileron has a slot that opens for downward deflections over 20 degrees, into a drooped state from the horizontal with reference to the trailing edge centerline; and controlling the lift augmentation system by varying the thrust of the distributed electric propulsion system, said flaps deflection angle, and the aileron droop angle.

BRIEF DESCRIPTION OF THE DRAWINGS

The foregoing and other advantages of the present disclosure will become apparent upon reading the following detailed description and upon reference to the drawings.

Figure 1A:
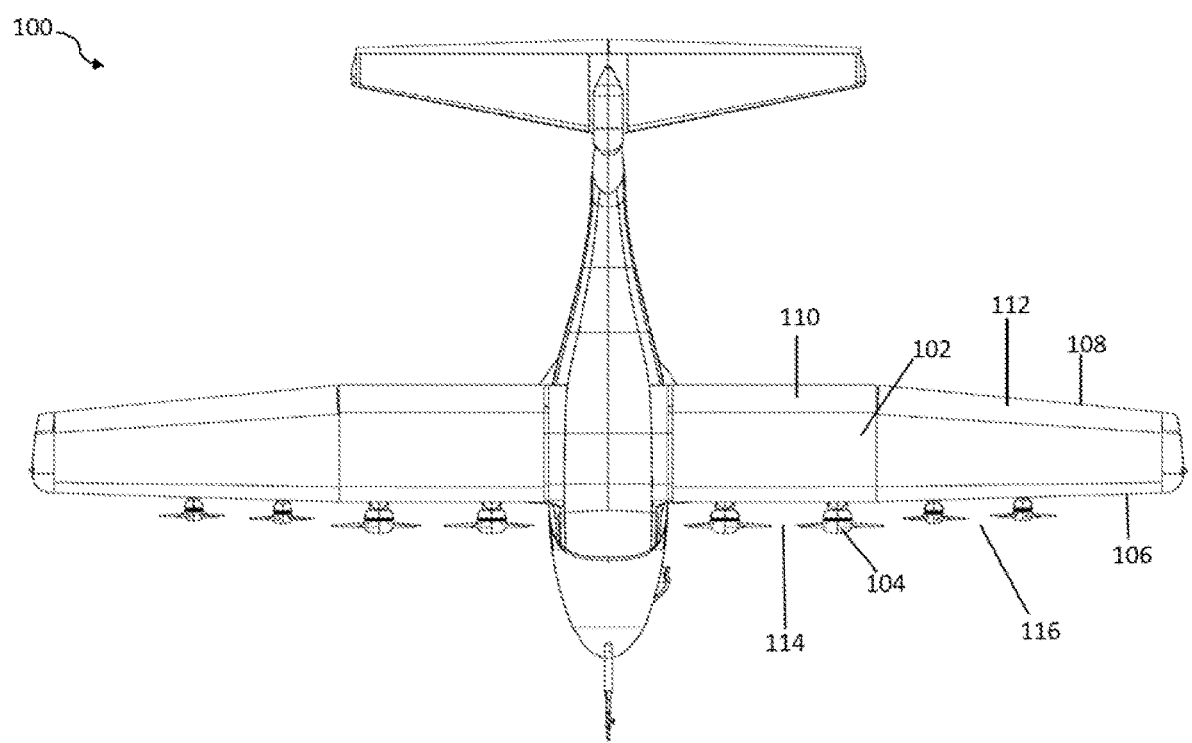
FIG. 1A is a top view configuration of an aircraft with the lift augmentation system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

The present disclosure is directed to a system and method for achieving lift augmentation of aircraft wings that enables steep descent and enhanced lateral control. The present disclosure identifies the ratio of propeller size to wing chord, number of propellers, flap size, and flap deflection enabled by a DEP system such that the propeller wake blows over both the upper and lower surfaces of an aircraft wing and flap. Propeller wake refers to the jet of high-velocity area created by a rotating propeller (i.e., slipstream, propulsive wake, or propeller wash). Advantageously, the upper surface blowing prevents the separation of the wing and aileron even at high angles of attack. Additionally, to increase the lift on the outboard wing sections the aileron can be drooped (symmetric deflection of the aileron on the left and right wings). As will be disclosed in further detail below, the control surface is still deflected differentially from the drooped position to control the roll moment. Furthermore, the drooped aileron also has a slot that opens at high deflection angles, which prevents the separation of the aileron at high deflection angles and increases the effectiveness of the jet deflection. Using the range of propeller sizes, wing chords, and aileron droop deflections discussed herein, the present disclosure advantageously creates high blowing over the lateral control surfaces with low excess thrust, thereby enhancing the low-speed lateral-directional control authority.

Figure 1B:
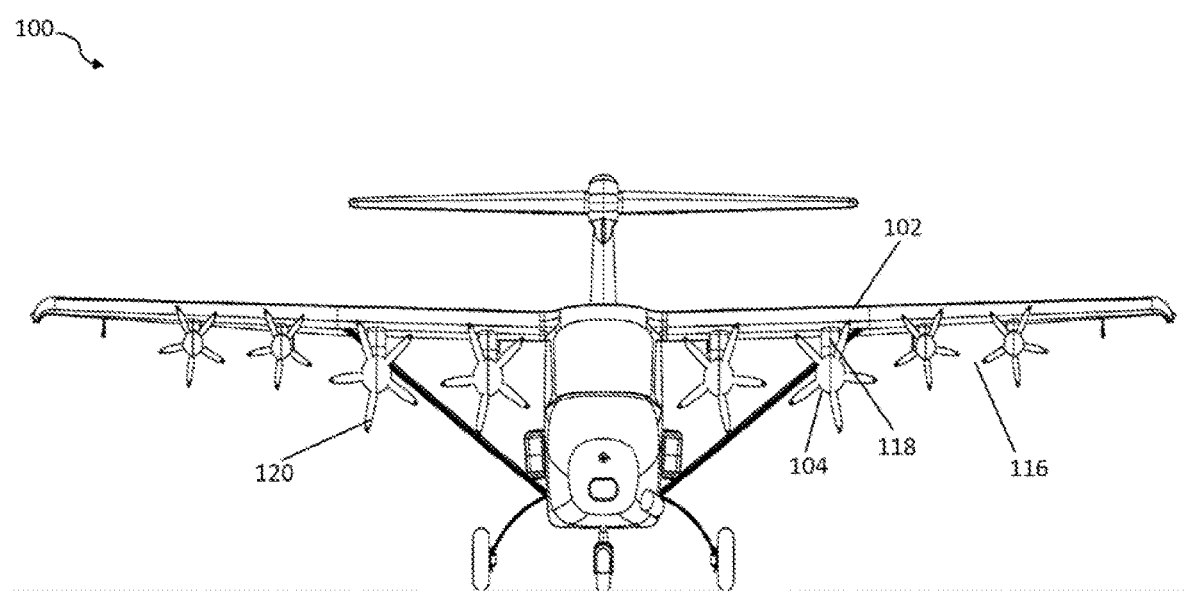
FIG. 1B is a front view configuration of an aircraft with the lift augmentation system in accordance with some embodiments.

FIG. 1A is a top view configuration of an aircraft with the lift augmentation system in accordance with some embodiments. FIG. 1B is a front view configuration of an aircraft with the lift augmentation system in accordance with some embodiments.

As shown in FIGS. 1A and 1B, an aircraft 100 is depicted. In various embodiments, FIGS. 1A and 1B depict an aircraft 100 in a cruise configuration comprising of a wing 102 that is blown by a thrust producing device 104, which could be a propeller, turbofan, turboprop, or any other means to produce thrust 120, that is powered by DEP. The wing 102 comprises a leading edge 106 and a trailing edge 108. The control surfaces of the aircraft 100 are connected to the trailing edge 108 of the wing, and are the flap 110 and the aileron 112. The wing is blown by the DEP system with inboard 114 and outboard motors 116. The thrust producing devices 104 are connected below the wing 102 to a pylon 118.

In various embodiments, a blown wing with DEP is disclosed. In some embodiments, as shown in FIGS. 1A and 1B, a blown wing is a wing 102 which interacts with the propulsive wake of an electric thrust producing device 104 arranged along its leading edge 106. In some embodiments, the propeller 120 center is typically located at or below the wing leading edge 106. As described herein, the deflection of the jet sheet by the wing 102 and flap 110 system increases the total lift of the wing 102. Jet sheet, or slipstream, refers to the sheet of high-velocity air formed from the merging of several propulsive wakes. The amount of the lift augmentation is proportional to the total momentum in the jet sheet (i.e., a stronger jet results in greater lift augmentation). In various embodiments of the blown wing 102, a substantial fraction of the span (>50%) has electric propellers or some other electric thrust producing device 104 lining the leading edge 106 for lift enhancement and is designed to use the propellers for high lift as well as thrust.

Figure 2A:
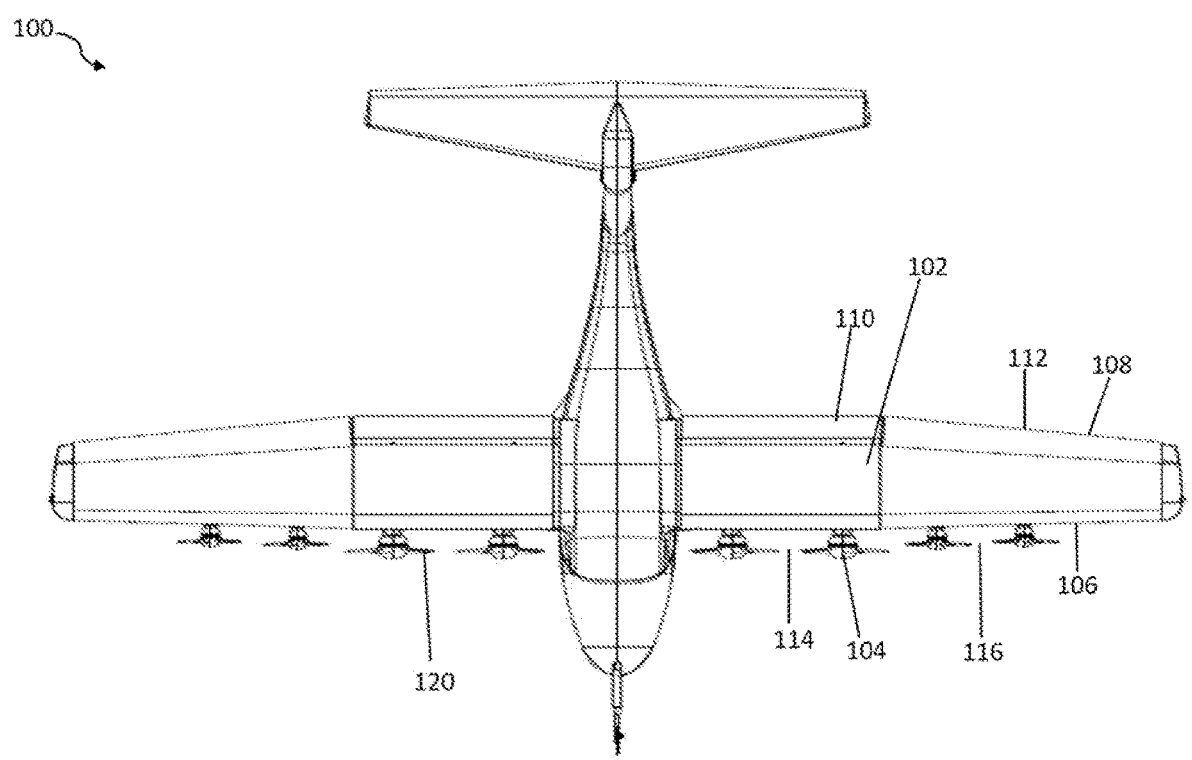
FIG. 2A is top view of an aircraft with the lift augmentation system in a takeoff configuration in accordance with some embodiments.
Figure 2B:
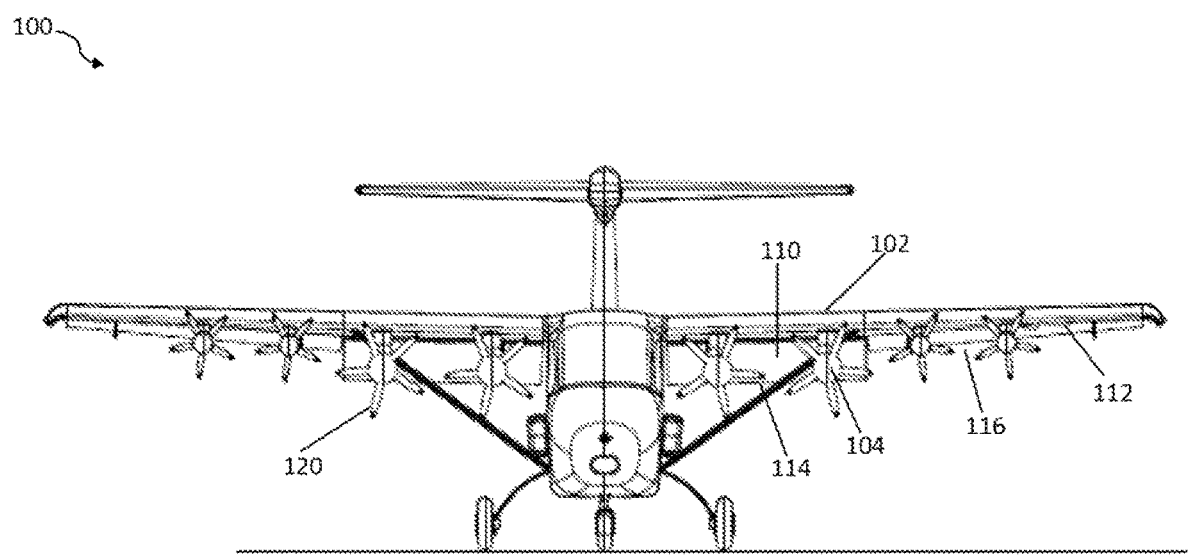
FIG. 2B is a front view of an aircraft with the lift augmentation system in a takeoff configuration in accordance with some embodiments.

FIG. 2A is top view of an aircraft with the lift augmentation system in a takeoff configuration and FIG. 2B is a front view of an aircraft with the lift augmentation system in a takeoff configuration, in accordance with some embodiments. Embodiments shown in FIGS. 2A and 2B comprise an aircraft 100, in a takeoff configuration, that comprises a wing 102 that is blown by a thrust producing device 104, which could be a propeller, turbofan, turboprop or any other means to produce thrust, that is powered by DEP. The wing 102 comprises a leading edge 106 and a trailing edge 108. The control surfaces of the aircraft 100 are connected to the trailing edge 108 of the wing, which could include flaps 110 and an aileron 112. The wing 102 is blown by the DEP system with inboard 114 and outboard motors 116. The thrust producing device 104 is connected below the wing 102 to a pylon 118. In this embodiment, the flaps 110 and aileron 112 are in a takeoff configuration.

Figure 2C:
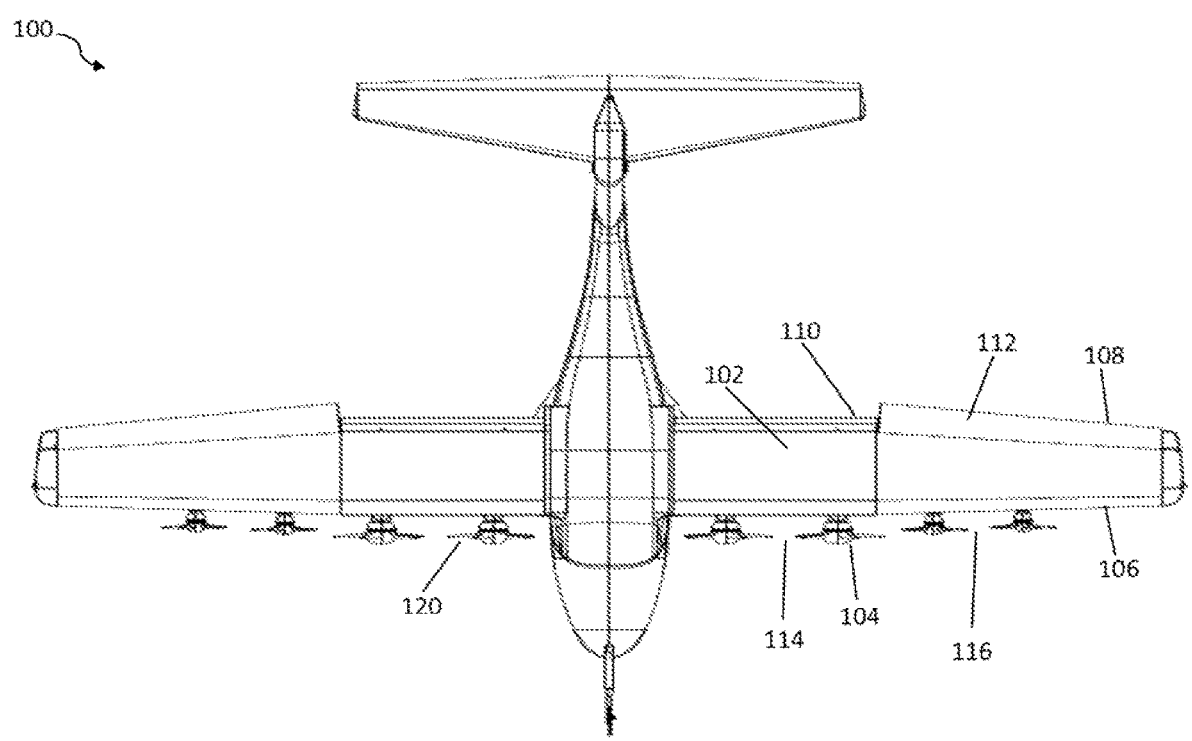
FIG. 2C is top view of an aircraft with the lift augmentation system in a landing configuration in accordance with some embodiments.
Figure 2D:
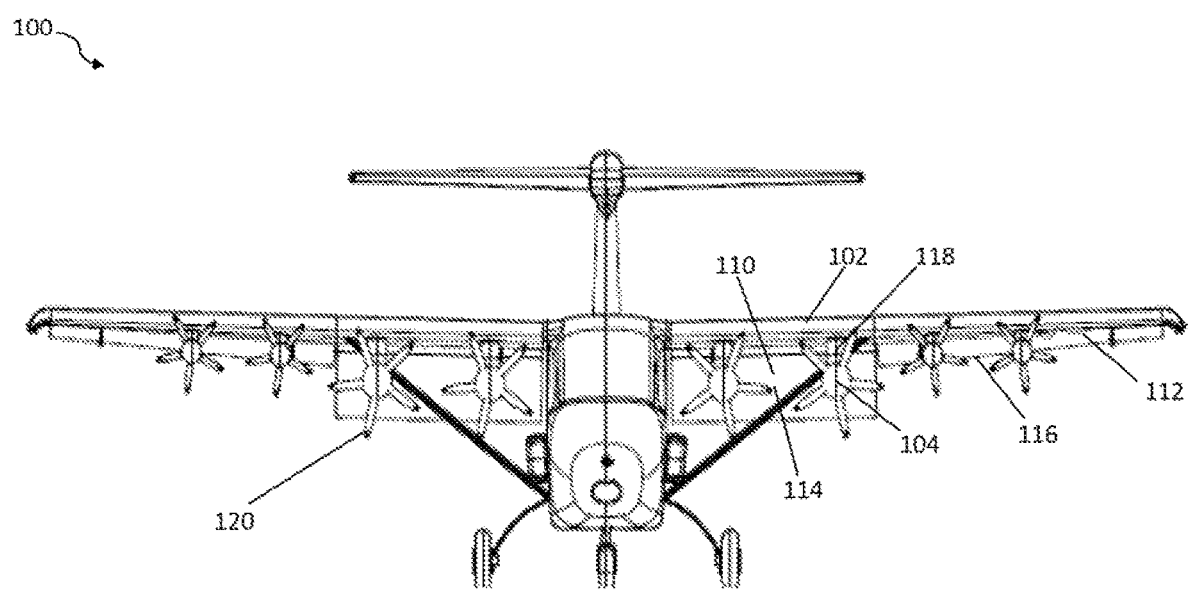
FIG. 2D is a front view of an aircraft with the lift augmentation system in a landing configuration in accordance with some embodiments.

FIG. 2C is top view of an aircraft with the lift augmentation system in a landing configuration and FIG. 2D is a front view of an aircraft with the lift augmentation system in a landing configuration, in accordance with some embodiments. The embodiments in FIGS. 2C and 2D depict an aircraft 100, in a landing configuration, that comprises a wing 102 that is blown by a thrust producing device 104, which could be a propeller, turbofan, turboprop or any other means to produce thrust, that is powered by DEP. The wing 102 comprises a leading edge 106 and a trailing edge 108. The control surfaces of the aircraft 100 are connected to the trailing edge 108 of the wing, which could include flaps 110 and an aileron 112. The wing 102 is blown by the DEP system with inboard 114 and outboard motors 116. The thrust producing device 104 is connected below the wing 102 to a pylon 118. In this embodiment, the flap 110 is deflected and aileron 112 is drooped for a landing configuration.

As previously described, DEP refers to the aircraft propulsion architecture that uses a plurality of electric motors to drive fans, propellers, or other thrust producing devices (propulsors) which are distributed around the airframe 104. DEP advantageously allows variability in the selection of the diameter of the propeller 120 (relative to the wing chord), and the size and deflection of the flaps 110 in such a way that high lift augmentation with adequate drag for a steep descent can be achieved, with a propeller 120 that is also efficient in cruise.

Figure 3:
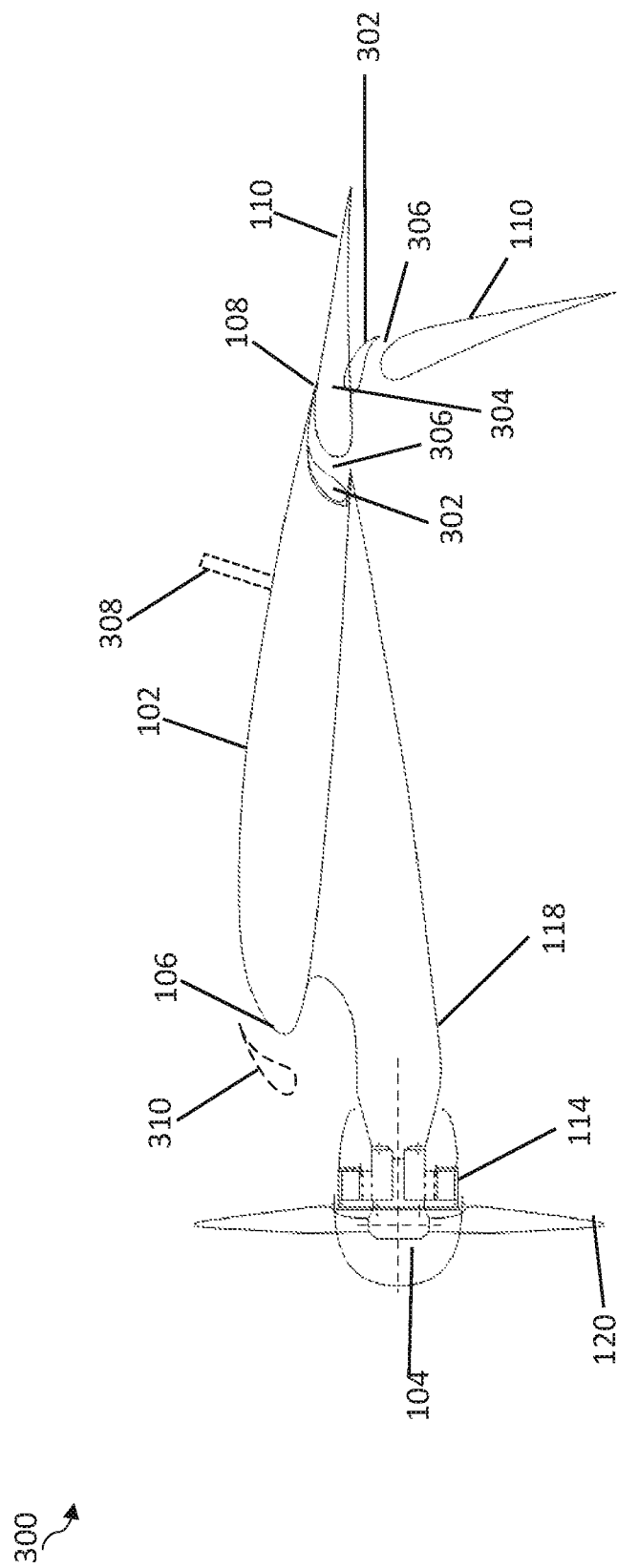
FIG. 3 is a detailed side perspective view of a double-slotted blown flap for use on an aircraft with the lift augmentation system in accordance with some embodiments.

FIG. 3 is a detailed side perspective view of a double-slotted blown flap for use on an aircraft with the lift augmentation system in accordance with some embodiments. The side view of a portion of an embodiment of the lift augmentation system, as shown in FIG. 3, comprises a thrust producing device 300 connected below the wing 102 to a pylon 118, which may utilize a propeller 120 to produce thrust. The wing 102 has a leading edge 106 and a trailing edge 108. The slipstream from the propeller 120 blows over the upper and lower section of the leading edge 106 and blows the flap 110 generating lift. The flap 110 is connected to the trailing edge 108 of the wing 102 and comprises a fixed or deployable turning vane 302. An embodiment showing the flap 110 in a landing configuration has a first slot 304 and a second slot 306. A second embodiment showing the flap 110 in a cruise configuration, can be seen with the slots closed.

Figure 4:
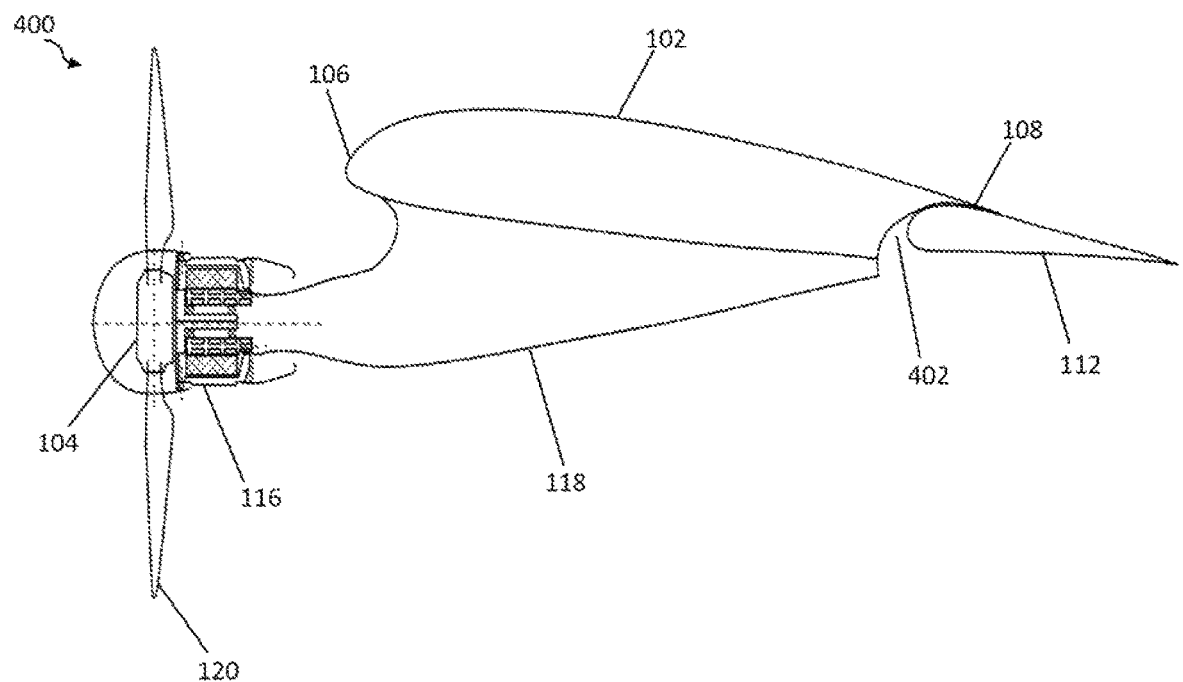
FIG. 4 is a detailed side perspective view of a blown aileron for use on an aircraft with the lift augmentation system in accordance with some embodiments.

FIG. 4 is a detailed side perspective view of a blown aileron for use on an aircraft with the lift augmentation system in accordance with some embodiments. The side view of a portion of an embodiment of the lift augmentation system, as shown in FIG. 4, comprises a thrust producing device 104 connected below the wing 102 to a pylon 118, which may utilize a propeller 120 to produce thrust. The wing 102 has a leading edge 106 and a trailing edge 108. The slipstream from the propeller 120 blows over the upper and lower section of the leading edge 106 and blows the aileron 112, which is slotted and adaptable to droop in takeoff and landing configurations generating lift as needed. FIG. 4 shows the aileron 112 in a cruise configuration with the slot 402 closed in accordance with some embodiments. The aileron 112 droop or deflection angle during cruise is configurable as well as during takeoff and landing.

Figure 5:
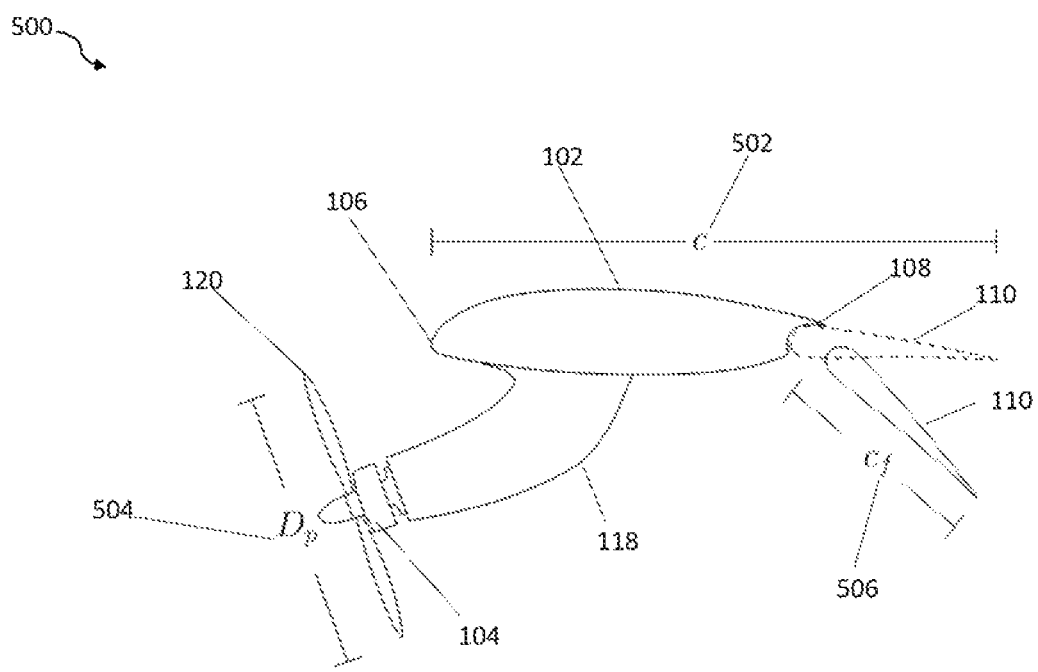
FIG. 5 is a side perspective view of a slotted blown flap, showing the key parameters for use on an aircraft with the lift augmentation system in accordance with some embodiments.

FIG. 5 is a side perspective view of a single-slotted blown flap or aileron, showing the key parameters for use on an aircraft with the lift augmentation system in accordance with some embodiments. As shown in FIG. 5, parameters associated with blown lift aircraft are identified. Specifically, FIG. 5 depicts a portion of a wing 102 with a wing chord 502 and a thrust producing device connected to a pylon 118 under the wing 102, where the thrust producing device is a propeller 120 with a predefined propeller angle from the vertical axis and propeller diameter 504. The slipstream from the propeller 120 blows over the top and bottom of the leading edge 106 of the wing to the trailing edge 108. The slipstream then blows over the flap 110. The flap 110 has a predefined flap chord 506 and is adaptable to retract for cruise as well as deflect for takeoff and landing configurations.

According to various embodiments, the ratio of propeller diameter 504 to wing chord 502 as described herein enhances performance for blown lift aircraft. By way of example, when the propeller diameter 504 is small relative to the wing chord 502, the slipstream is more effectively turned by the flap 110 and the lift performance is increased.

According to various embodiments, the ratio of the propeller diameter 504 to flap chord 506 (Dp/cf) and relative size of the flap 110 (cf/c) to wing chord 502 are critical parameters. In some embodiments, maximum jet sheet deflection is determined according to the vertical position of the propellers 120 relative to the wing 102, and the tilt of the propeller 120 from the vertical.

According to various embodiments, a substantial fraction of the wing 102 (>50%) blown by the thrust producing devices 104 achieves a ratio Dp/c of 0.2-0.8. Advantageously, ratios in this range enable effective deflection of the slipstream by the flap 110; as the propeller 120 size shrinks relative to the wing 102, the flap 110 is more effective at deflecting the propeller slipstream. This deflection of the slipstream by the flap 110 is the primary source of lift augmentation. In some embodiments, the center point of the propeller 120 is located below the wing leading edge point 106, and the propeller 120 angle is inclined approximately 7 degrees from the vertical.

Figure 6:
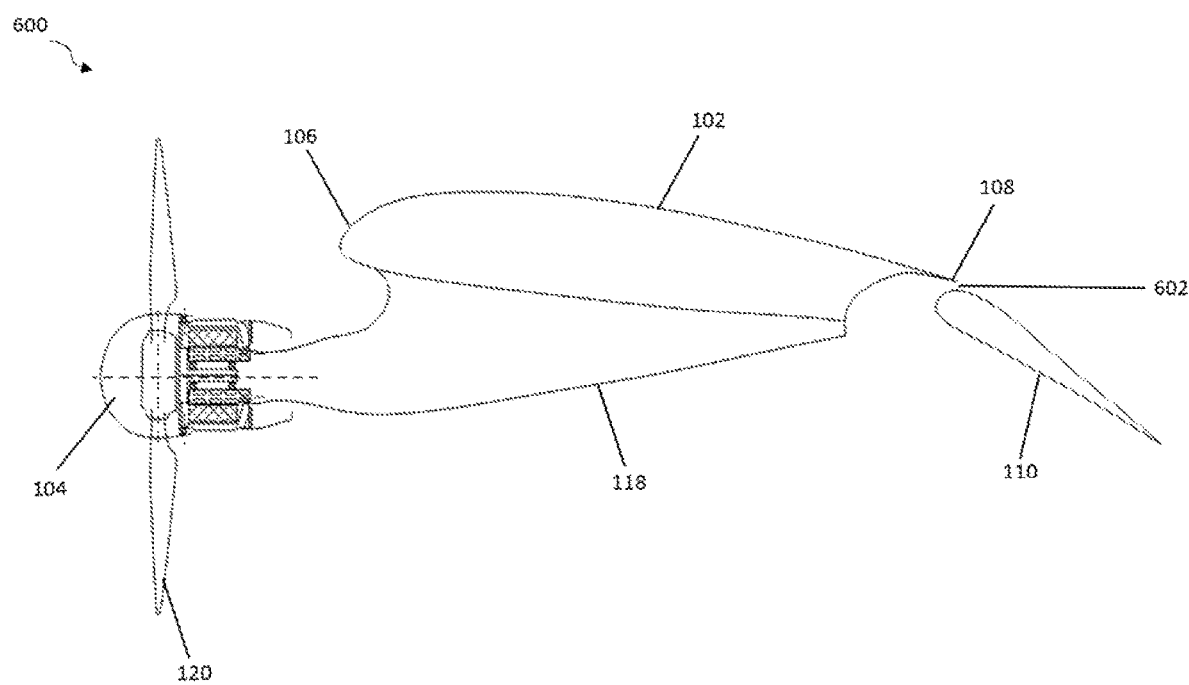
FIG. 6 is a side perspective view of propeller slipstream interaction to achieve blown lift for use on an aircraft with the lift augmentation system in accordance with some embodiments.

FIG. 6 is a side perspective view of propeller slipstream interaction to achieve blown lift for use on an aircraft with the lift augmentation system in accordance with some embodiments. The side view of a portion of an embodiment of the lift augmentation system, as shown in FIG. 6, comprises a thrust producing device 104 connected below the wing 102 to a pylon 118, which may utilize a propeller 120 to produce thrust from a Distributed Electric Propulsion motor 104. The wing 102 has a leading edge 106 and a trailing edge 108. In some embodiments the top of the propeller 120 will extend over the leading edge 106 of the wing 108. The slipstream from the propeller 104 blows over the upper and lower section of the leading edge 106 and blows the flap 110 generating lift. The flap 110 is connected to the trailing edge 108 of the wing 102. The flap 110 deflected for takeoff or landing may be seen with at least one slot 602 according to some embodiments.

Figure 7:
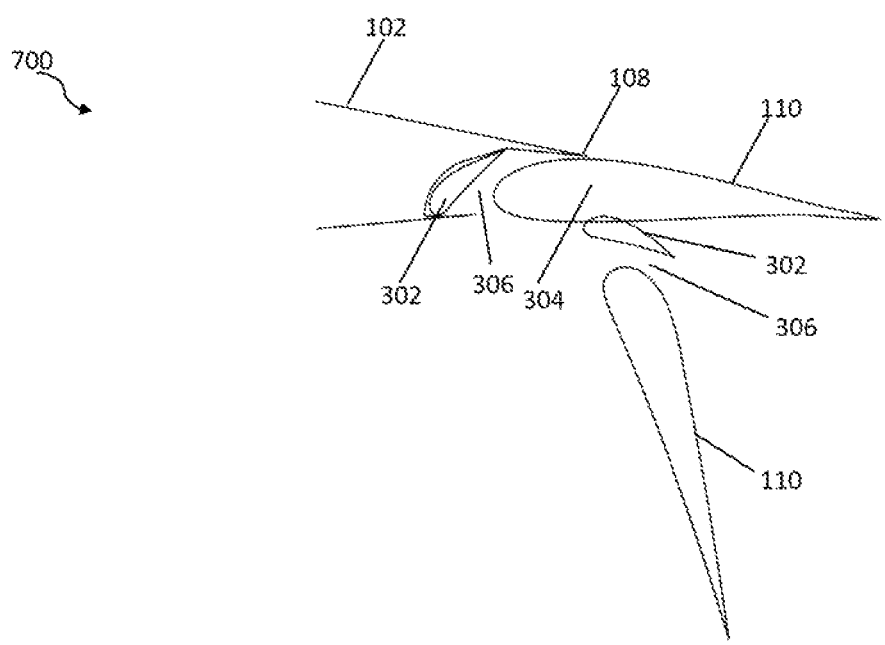
FIG. 7 is a side perspective view of a "Fowler" flap coupled to a fixed turning vane to achieve blown lift for use on an aircraft with the lift augmentation system in accordance with some embodiments.

FIG. 7 is a side perspective view of a "Fowler" flap coupled to a fixed turning vane to achieve blown lift for use on an aircraft with the lift augmentation system in accordance with some embodiments. The side perspective of an embodiment of the "Fowler Flap," as shown in FIG. 7, comprises a wing 102 with a trailing edge 108 with the flap 110 connected to the trailing edge 108. The flap 110 may be connected to the wing with a turning vane 302. The turning vane 302 may be adaptable to retract and extend to deflect depending on the flight configuration. The flap 110 may extend outward and deflect during takeoff and landing. The extended and deflected flap 110 may also have a first slot 304 and a second slot 306 according to some embodiments. The flap 110 may also retract for cruise where the slots would be closed in accordance with some embodiments.

Figure 8A:
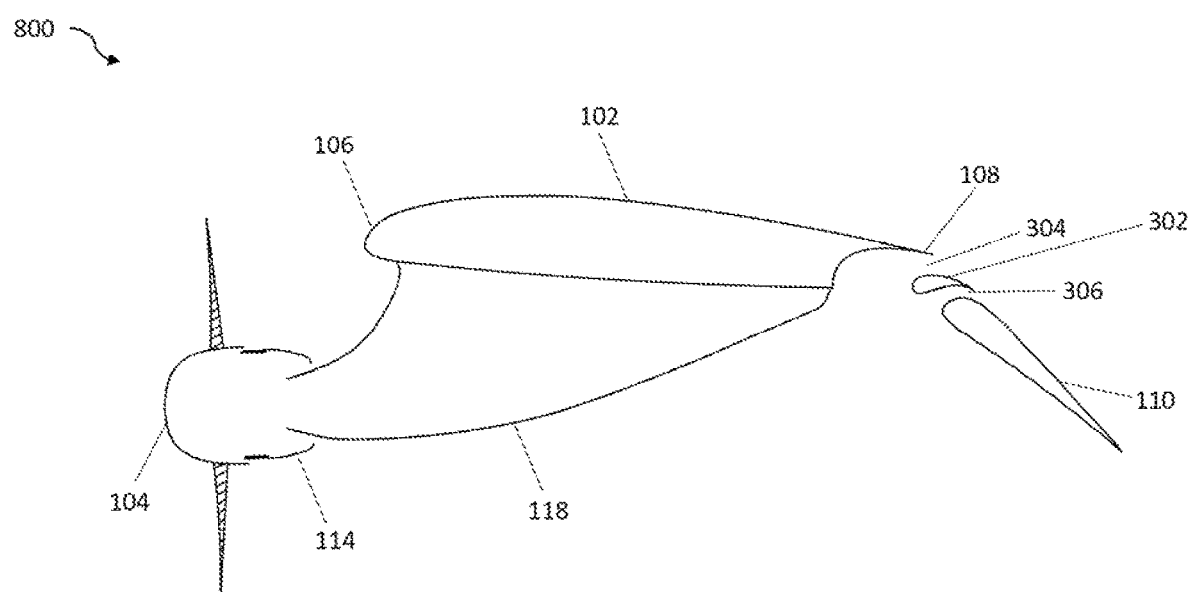
FIG. 8A is a cross sectional perspective view of the propeller with the flaps in a landing configuration in accordance with some embodiments.
Figure 8B:
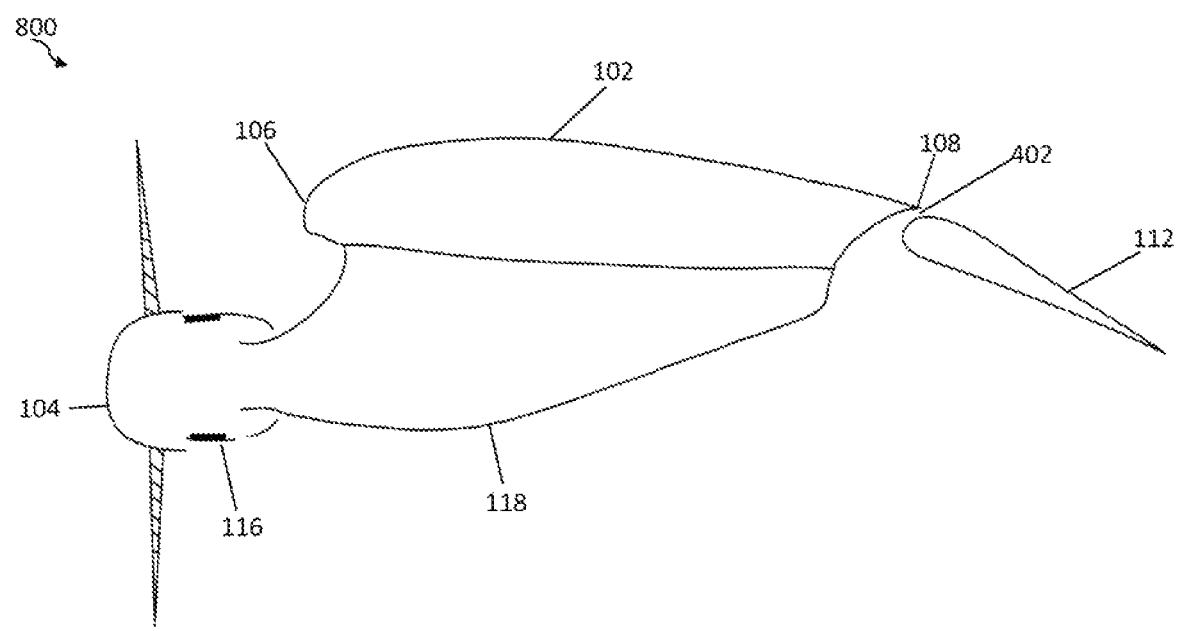
FIG. 8B is a cross sectional perspective view of the propeller with the aileron in a landing configuration in accordance with some embodiments.

FIG. 8A is a cross sectional perspective view of the propeller with the flaps in a landing configuration in accordance with some embodiments. FIG. 8B is a cross-sectional perspective view of the propeller with the aileron in a landing configuration in accordance with some embodiments. According to some embodiments, as shown in FIGS. 8A and 8B, a lift augmentation system is depicted in a landing configuration, which comprises a cross section of a wing 102 with a leading edge 106 and a trailing edge 108 with a plurality of thrust producing devices 104 forming a distributed electric propulsion system. The thrust producing device is connected below the wing 102 to a pylon 118. The wing 102 may have flaps 110 as shown in FIG. 8A and an aileron 112 as shown in FIG. 8B deflected for landing. The flaps 110 may be connected and operated with a turning vane 302 and may have a first slot 304 and a second slot 306. The flaps 110 are blown by the slipstream of the inboard thrust producing devices 114. The aileron 112, which is also connected to the trailing edge 108 of the wing 102, may also have a slot 402 and is blown by the slipstream of the outboard thrust producing devices 116.

Figure 9A:
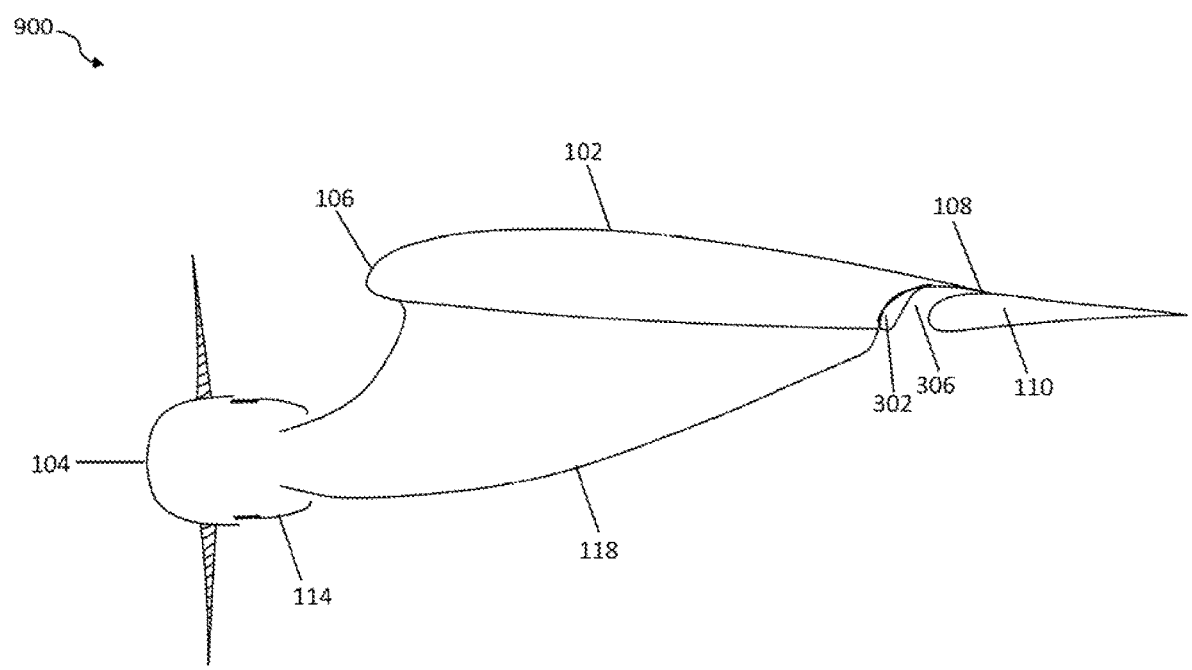
FIG. 9A is a cross sectional perspective view of the propeller with the flaps in a retracted configuration in accordance with some embodiments.
Figure 9B:
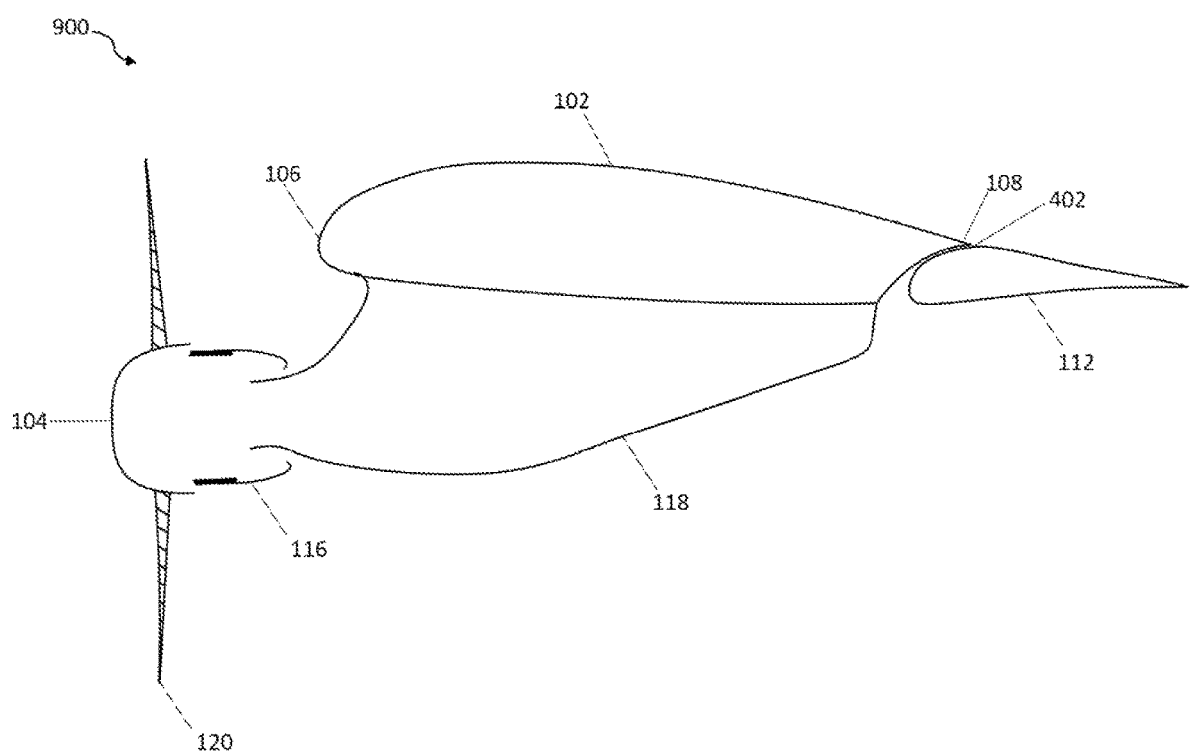
FIG. 9B is a cross sectional perspective view of the propeller with the aileron in a retracted configuration in accordance with some embodiments.

FIG. 9A is a cross-sectional perspective view of the propeller with the flaps in a retracted configuration in accordance with some embodiments. FIG. 9B is a cross-sectional perspective view of the propeller with the aileron in a retracted configuration in accordance with some embodiments. According to some embodiments, as shown in FIGS. 9A and 9B, a lift augmentation system is depicted in a cruise configuration 900, which comprises a cross-section of a wing 102 with a leading edge 106 and a trailing edge 108 with a plurality of thrust producing devices 104 forming a distributed electric propulsion system. The thrust producing device is connected below the wing 102 to a pylon 118. The flap 110 may be connected and operated with a turning vane 302 with the slots closed in a cruise configuration as shown in FIG. 9A. The flaps 110 are blown by the slipstream of the inboard thrust producing devices 114. The aileron 112, which is also connected to the trailing edge 108 of the wing 102, may also have a closed slot 402 and is blown by the slipstream of the outboard thrust producing devices 116 as shown in FIG. 9B.

Figure 10A:
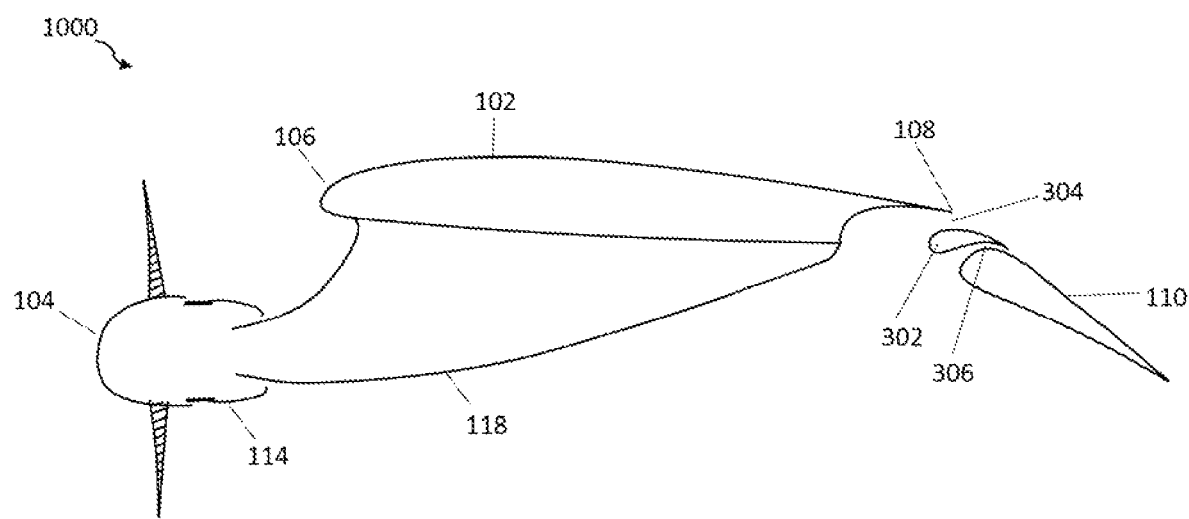
FIG. 10A is a cross sectional perspective view of the propeller with the flaps in a takeoff configuration in accordance with some embodiments.
Figure 10B:
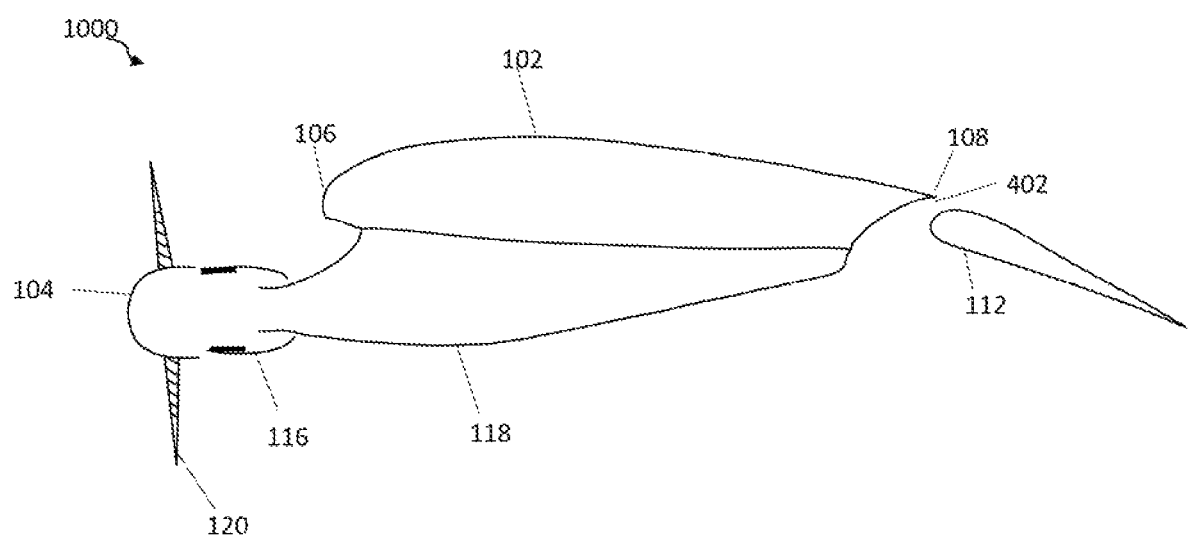
FIG. 10B is a cross sectional perspective view of the propeller with the aileron in a takeoff configuration in accordance with some embodiments.

FIG. 10A is a cross-sectional perspective view of the propeller with the flaps in a takeoff configuration in accordance with some embodiments. FIG. 10B is a cross-sectional perspective view of the propeller with the aileron in a takeoff configuration in accordance with some embodiments. According to some embodiments, as shown in FIGS. 10A and 10B, the lift augmentation system comprises a cross-section of a wing 102 with a leading edge 106 and a trailing edge 108 with a plurality of thrust producing devices 104 forming a distributed electric propulsion system. The thrust producing devices 104 are connected below the wing 102 to a pylon 118. The wing 102 may have flaps 110 and an aileron 112 deflected for takeoff. The flaps 110 may be connected and operated with a turning vane 302 and may have a first slot 304 and a second slot 306 as shown in FIG. 10A. The flaps 110 are blown by the slipstream of the inboard thrust producing devices 114. The aileron 112, which is also connected to the trailing edge 108 of the wing 102, may also have a slot 402 and is blown by the slipstream of the outboard thrust producing devices 116 as shown in FIG. 10B.

According to various embodiments, the lift augmentation system and method include an inboard "Fowler" flap 110 operably coupled to a fixed or deployable turning vane 302 disposed on top of the fowler flap 110. In some embodiments, the Fowler flap 110 deflects 20 to 90 degrees and has a chord 506 of at least 20% wing chord 502. In various embodiments, the ratio of flap chord 506 to wing chord 502 may vary between 20%-45%. In various embodiments, the flap 110 configuration allows effective deflection of the relatively compact jet without the need for more mechanically complex deployable double- or triple-slotted flaps. In some embodiments, the flap 110 is fully blown by the inboard propellers 114, with at least two propellers blowing over each flap surface. In some embodiments, the vertical position of the propellers 120 is such that the top edge of the propeller 120 extends a predetermined percentage of the wing chord 502 above the wing leading edge 106.

According to various embodiments, the lift augmentation system includes an outboard drooped aileron 112 (flaperon), having a slot 402 between the aileron 112 and wing 102 that opens at deflection angles above 20 degrees. A flaperon 112 refers to an aerodynamic control surface which deflects symmetrically to give a flap effect and differentially to give an aileron effect (i.e., a drooped aileron). In some embodiments, the maximum deflection angle of the flaperon 112 is at least 35 degrees. In various embodiments, each flaperon 112 is blown by one or more motors 116. In some embodiments, the vertical position of the propeller 120 is such that the top edge of the propeller 120 extends a certain percentage wing chord 502 above the wing leading edge 106.

According to various embodiments, smaller ratios of Dp/c (approximately 0.2-0.3) may be desirable for propellers 120 designed to generate high lift, to enhance lateral control.

According to various embodiments, larger ratios of Dp/c (approximately 0.6-0.8) may be desirable for propellers 120 designed to generate high lift, and/or reduce motor power requirements. In some embodiments, intermediate ratios between 0.3 and 0.6 are adequate in providing high lift and low power.

As best shown in FIGS. 1-2, according to some embodiments, the compact size of the thrust producing devices 104 also allows high blowing over the ailerons 112 without high excess thrust. Advantageously, this increases the aileron 112 effectiveness and allows for enhanced lateral control of the aircraft at low speeds.

According to various embodiments, as depicted in FIGS. 1-2, four inboard propellers 114 are provided which causes blowing over the deflected flaps 110. In some embodiments, as depicted in FIGS. 1-2, four outboard propellers 116 cause blowing over single-slotted drooped ailerons 112.

According to embodiments of the present disclosure, aircraft 100 includes a flap turning vane 302 that is fixed. In other embodiments, the flap turning vane 302 is deployable. In some embodiments, the plurality of motors 104 blowing over the flap 110 and/or drooped aileron 112 may vary (i.e., may include more or less motors than are depicted in the figures). Additionally, according to some embodiments, an additional slot or slots may be added to the drooped aileron 112. In further embodiments, the drooped aileron 112 may not have a slot. In other embodiments, other versions of roll control devices could be used, such as spoilers 308, which could allow for full span flaps. In some embodiments, propeller 120 height and angle may vary relative to the wing. In various embodiments, propeller 120 heights can be moved from centers even with the wing 102 leading edge 106 to the top of the propeller 120 even with the wing leading edge 106. In various embodiments, propeller 120 angles can vary between 0-20 degrees relative to the vertical. In some embodiments, the inboard blown flaps 110 may have a deployable vane 302. In some embodiments, the inboard blown flaps 110 may have additional slots (3) with fixed or deployable vanes 302. Yet still, in various embodiments, the use of moving double-slotted, or triple-slotted flaps 110 may be included to enhance propeller 120 wake deflection. In some embodiments, the leading edge 106 of the wing 102 may be equipped with a fixed or moveable slot or a slat 310. In some embodiments, the drooped aileron can have two or three slots to enhance the achievable droop angle. In some embodiments, the roll control power of the drooped aileron may be enhanced using roll spoilers 308.

In other embodiments, the thrust producing devices 104 are integrally connected below the wing 102 far enough back on the bottom side of the wing 102 to allow for an unobstructed leading edge 106. This thrust producing device 104, such as a motor pod, could be located on the bottom side of the wing as little as 5% of the wing chord 502 back from the leading edge 106. An unobstructed leading edge 106 refers to a leading edge 106 that is not significantly blown by the thrust producing device 104, if at all, and the top side of the wing 120 essentially interacts with clean air not blown by the thrust producing devices 104. In some embodiments, devices, such as sheets (made from metal, plastic, etc.) could be used to block blown air from the thrust producing devices 104 giving the same unobstructed leading edge 106 effect.

Figure 11:
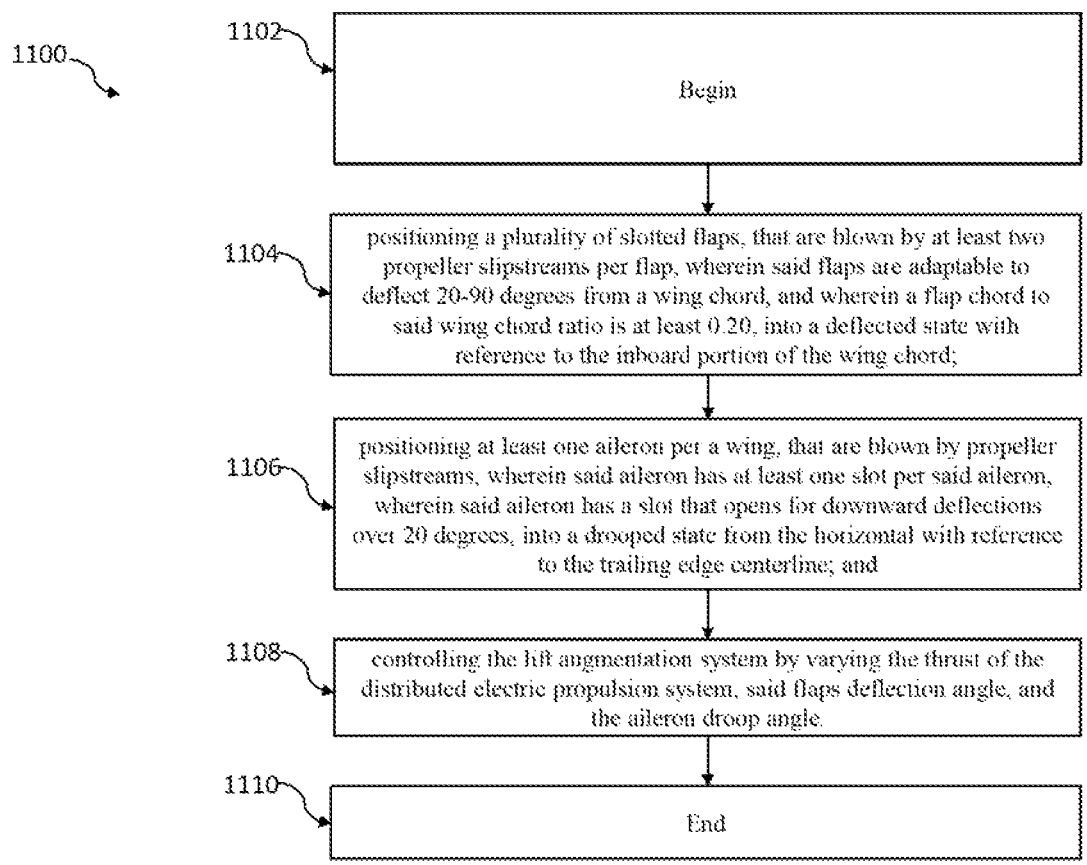
FIG. 11 is a block diagram for the method of using the lift augmentation system in accordance with some embodiments.

FIG. 11 is a block diagram for the method 1100 of using the lift augmentation system in accordance with some embodiments. The method begins at step 1102. At 1104, a plurality of slotted flaps are positioned, that are blown by at least two propeller slipstreams per flap, wherein said flaps are adaptable to deflect 20-90 degrees from a wing chord, and wherein a flap chord to said wing chord ratio is at least 0.20, into a deflected state with reference to the inboard portion of the wing chord. At 1106, at least one slotted aileron per wing is positioned, that are blown by propeller slipstreams, wherein said aileron has at least one slot per said aileron, wherein said aileron has a slot that opens for downward deflections over 20 degrees, into a drooped state from the horizontal with reference to the trailing edge centerline. At 1108, the lift augmentation system is controlled by varying the thrust of the distributed electric propulsion system, said flaps deflection angle, and the aileron droop angle. The method ends at step 1110.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

The invention claimed is:

1. A system for lift augmentation of an aircraft having only a one pair of wings, wherein each wing of the one pair of wings has a leading edge and a trailing edge extending along a wingspan, a plurality of propellers connected to the bottom of each wing, one flap connected to an inboard portion of each wing proximate the trailing edge, and a slotted aileron connected to each wing, the system comprising:
   a plurality of slipstreams, wherein each of the plurality of slipstreams are associated with a respective one of the plurality of propellers, and wherein the plurality of slipstreams blow over at least 50% of said wingspan;
   each of the plurality of propellers have a propeller diameter of 20% to 80% of a wing chord of each wing;
   each of the plurality of propellers are operably connected to the bottom of each wing with a rotational axis of each of the plurality of propellers at an angle of 1-20 degrees from the wing chord of each wing proximate the respective propeller;
   said flap on each wing are double slotted and adaptable to deflect 20-90 degrees from a chord of the inboard portion of each wing, wherein a flap chord is at least 20% of the wing chord of each wing, wherein the flap on each wing are blown by two slipstreams corresponding to two of the plurality of propellers; and
   the slotted aileron is operatively coupled to an outboard portion of each wing proximate the trailing edge, wherein the slotted aileron operatively coupled to the outboard portion of each wing is blown by two of the plurality of propellers, and wherein the aileron on each wing are adaptable to droop below the trailing edge of each wing and have a slot that is configured to be closed until a downward deflection angle of at least 20 degrees.

2. The system for lift augmentation in claim 1, wherein each of said wings have at least one slat on the leading edge of each wing.

3. The system for lift augmentation in claim 1, wherein the plurality of propellers per wing are electric propulsion units forming a distributed electric propulsion system.

4. The system for lift augmentation in claim 1, wherein said flaps are adapted to move aft of said trailing edge of each wing.

5. The system for lift augmentation in claim 1, wherein said flaps are adaptable to deflect 60-70 degrees from a chord of the inboard portion of each wing.

6. The system for lift augmentation in claim 1, wherein each of said plurality of propellers has a diameter of 30% to 60% of the wing chord of each wing.

7. The system for lift augmentation in claim 1, wherein the rotational axis of each of said plurality of propellers is at an angle between 5-10 degrees from the wing chord line of each wing proximate the respective propeller.

8. A system for lift augmentation of an aircraft having only a one pair of wings, wherein each wing of the one pair of wings has a leading edge and a trailing edge extending along a wingspan, a distributed electric propulsion system including a plurality of propellers connected to each wing, one double slotted flap connected to an inboard portion of each wing proximate the trailing edge with a turning vane, and a slotted aileron connected to an outboard portion of each wing proximate the trailing edge, the system comprising:
   a plurality of slipstreams, wherein the plurality of slipstreams are associated with each of the plurality of propellers, wherein the slipstreams blow 50% or more of said wingspan, and the plurality of propellers each have a propeller diameter of 20% to 80% of a wing chord of each wing;
   each of the plurality of propellers are operably connected to the bottom of each wing with a rotational axis of each propeller at an angle of 1-20 degrees from the wing chord of each wing proximate the respective propeller;
   said flap on each wing are adaptable to deflect 20-90 degrees from a chord of the inboard portion of each wing wherein a flap chord to said wing chord ratio is at least 20%, wherein said flap on each wing are blown by the slipstream wake of two of the plurality of propellers; and
   said aileron on each wing are adaptable to droop below the trailing edge of each wing, wherein said ailerons have at least one slot that is configured to be closed until a downward deflection angle of at least 20 degrees, and said ailerons are blown by two of the plurality of propellers.

9. The system for lift augmentation in claim 8, wherein each wing has at least one slat on said leading edge of each wing.

10. The system for lift augmentation in claim 8, wherein said flaps are adapted to move aft of said trailing edge of each wing.

11. The system for lift augmentation in claim 8, wherein said flaps are adaptable to deflect 60-70 degrees from a chord of the inboard portion of each wing.

12. The system for lift augmentation in claim 8, wherein said propeller blade diameter is 30% to 60% of the wing chord of each wing.

13. A method of lift augmentation of aircraft wings with a distributed electric propulsion system, wherein said distributed electric propulsion system utilizes a plurality of propellers for thrust for an aircraft, wherein a plurality of propeller slipstream wakes associated with each of the plurality of propellers are configured to blow over the top and bottom of only a one pair of wings, wherein each wing of the one pair of wings has a leading edge and a trailing edge, wherein each of the plurality of propellers are operably connected to the bottom of each wing with a rotational axis of each propeller at an angle of 1-20 degrees from the wing chord of each wing proximate the respective propeller; and the plurality of propellers have a diameter of 20% to 80% of a wing chord of each wing, the method comprising:
   positioning a double slotted flap per wing, that are blown by two propeller slipstreams per flap, wherein said flap on each wing are adaptable to deflect 20-90 degrees from a wing chord of each wing, and wherein a flap chord to said wing chord of each wing ratio is at least 20%, into a deflected state with reference to the inboard portion of the wing chord of each wing;
   positioning one aileron per wing, that are blown by two propeller slipstreams, wherein said aileron on each wing have one slot per said aileron, wherein said aileron slot are configured to be closed until a downward deflection angle of at least 20 degrees, into a drooped state from the horizontal with reference to the trailing edge centerline; and controlling the lift augmentation system by varying the thrust of the distributed electric propulsion system, said flaps deflection angle, and said ailerons droop angle.

\* \* \* \* \*